(12) United States Patent
Watanabe (10) Patent No.: US 7,656,440 B2
(45) Date of Patent: Feb. 2, 2010

(54) PROCESSING DEVICE MOUNTED IN AN IMAGE SENSING APPARATUS HAVING A MEMORY STORING INFORMATION ON POSSIBLE CONFIGURATIONS OF A LOGIC CIRCUIT

(75) Inventor: Gaku Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 11/156,482

(22) Filed: Jun. 21, 2005

(65) Prior Publication Data

US 2006/0001746 A1 Jan. 5, 2006

(30) Foreign Application Priority Data

Jun. 30, 2004 (JP) .............................. 2004-194297

(51) Int. Cl.
H04N 5/77 (2006.01)
G06F 13/00 (2006.01)
G06F 13/28 (2006.01)
H04N 5/907 (2006.01)

(52) U.S. Cl. .................................. 348/231.9; 711/115
(58) Field of Classification Search .................. 361/684; 711/115; 348/231.99, 231.7, 231.8, 231.9
See application file for complete search history.

(56) References Cited

U.S. PATENT DOCUMENTS

| | | | | |
|---|---|---|---|---|
| 5,153,730 A | * | 10/1992 | Nagasaki et al. | 348/231.8 |
| 5,563,655 A | * | 10/1996 | Lathrop | 348/231.9 |
| 5,739,850 A | * | 4/1998 | Hori | 348/231.99 |
| 5,821,994 A | * | 10/1998 | Tani | 348/222.1 |
| 7,142,731 B1 | | 11/2006 | Toi | 382/307 |
| 7,197,189 B2 | * | 3/2007 | Adelmann | 348/231.9 |
| 7,383,386 B1 | * | 6/2008 | Iyer et al. | 711/115 |
| 7,392,343 B2 | * | 6/2008 | Oshima | 711/115 |
| 7,409,477 B2 | * | 8/2008 | Wyatt et al. | 711/115 |
| 7,429,242 B2 | | 9/2008 | Kawata | 600/109 |
| 2003/0007703 A1 | * | 1/2003 | Roylance | 382/303 |
| 2004/0085442 A1 | | 5/2004 | Kawata | 348/65 |
| 2004/0104840 A1 | * | 6/2004 | Awata et al. | 342/357.12 |
| 2004/0212710 A1 | * | 10/2004 | Fredlund et al. | 348/333.01 |
| 2005/0015540 A1 | * | 1/2005 | Tsai et al. | 711/115 |
| 2005/0036034 A1 | * | 2/2005 | Rea et al. | 348/207.1 |
| 2009/0006749 A1 | * | 1/2009 | Weirauch et al. | 711/115 |

FOREIGN PATENT DOCUMENTS

| | | | |
|---|---|---|---|
| JP | 09190515 A | * | 7/1997 |
| JP | 2000-235644 | | 8/2000 |
| JP | 2000267768 A | * | 9/2000 |
| JP | 2000-324430 | | 11/2000 |
| JP | 2002208661 A | * | 7/2002 |
| JP | 2003-024272 | | 1/2003 |

OTHER PUBLICATIONS

Oct. 23, 2009 Japanese Office Action in Japanese Application No. 2004-194297.

* cited by examiner

Primary Examiner—Jason Whipkey
(74) Attorney, Agent, or Firm—Fitzpatrick, Cella, Harper & Scinto (57) ABSTRACT

A detachable processing device that is mounted in an image sensing apparatus, integrated, and used by the device includes a logic circuit that can be changed to a plurality of configurations, which implement functions corresponding to a plurality of processes performed by the image sensing apparatus, a memory that stores possible configurations of the logic circuit, and a controller that controls the configuration of the logic circuit on the basis of the logical configurations stored in the memory.

14 Claims, 8 Drawing Sheets

PROCESSING DEVICE MOUNTED IN AN IMAGE SENSING APPARATUS HAVING A MEMORY STORING INFORMATION ON POSSIBLE CONFIGURATIONS OF A LOGIC CIRCUIT

FIELD OF THE INVENTION

The present invention relates to a detachable processing device which is mounted and used in an image sensing apparatus, and an image sensing apparatus.

BACKGROUND OF THE INVENTION

A conventional digital camera processes, within its main body, image information obtained from an image sensing element, converts the image information into image data, and saves the image data on a recording medium. As the recording medium, detachable recording media, such as a rewritable flash memory card are often used.

A conventional digital camera of this type executes an image process in only its main body, and a large part of the image process is defined by hardware in the main body. Even if the user is not satisfied with the image performance of the camera, the hardware cannot be exchanged.

To solve this problem, there is proposed a method of implementing some of the functions of the hardware configuration by software (computer program) and after the user purchases a camera, separately updating the program into the camera (see, e.g., Japanese Patent Application Laid-Open No. 2000-324430).

However, when a new hardware process or image processing method is developed and the camera cannot deal with it by only altering the program in the main body, the user has to buy a new camera.

SUMMARY OF THE INVENTION

The present invention has been made in consideration of the above situation, and has as its object to easily improve the function of an image sensing apparatus without changing the image sensing apparatus itself.

According to the present invention, the foregoing object is attained by providing a processing device that is mounted in an image sensing apparatus, integrated, and used by the camera, comprising: a logic circuit that can be changed to a plurality of configurations which implement functions corresponding to a plurality of processes performed by the image sensing apparatus; a memory that stores configuration information indicative of possible configurations of the logic circuit; and a controller that controls the configuration of the logic circuit on the basis of the configuration information stored in the memory.

According to the present invention, the foregoing object is also attained by providing an image sensing apparatus comprising: a connection unit that can integrally mount the above-discussed processing device; and a display unit that displays that some of processes of the image sensing apparatus are executed by the processing device when the processing device is mounted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings. However, the dimensions, shapes and relative positions of the constituent parts shown in the embodiment should be changed as convenient depending on various conditions and on the structure of the apparatus adapted to the invention, and the invention is not limited to the embodiment described herein.

Figure 1:
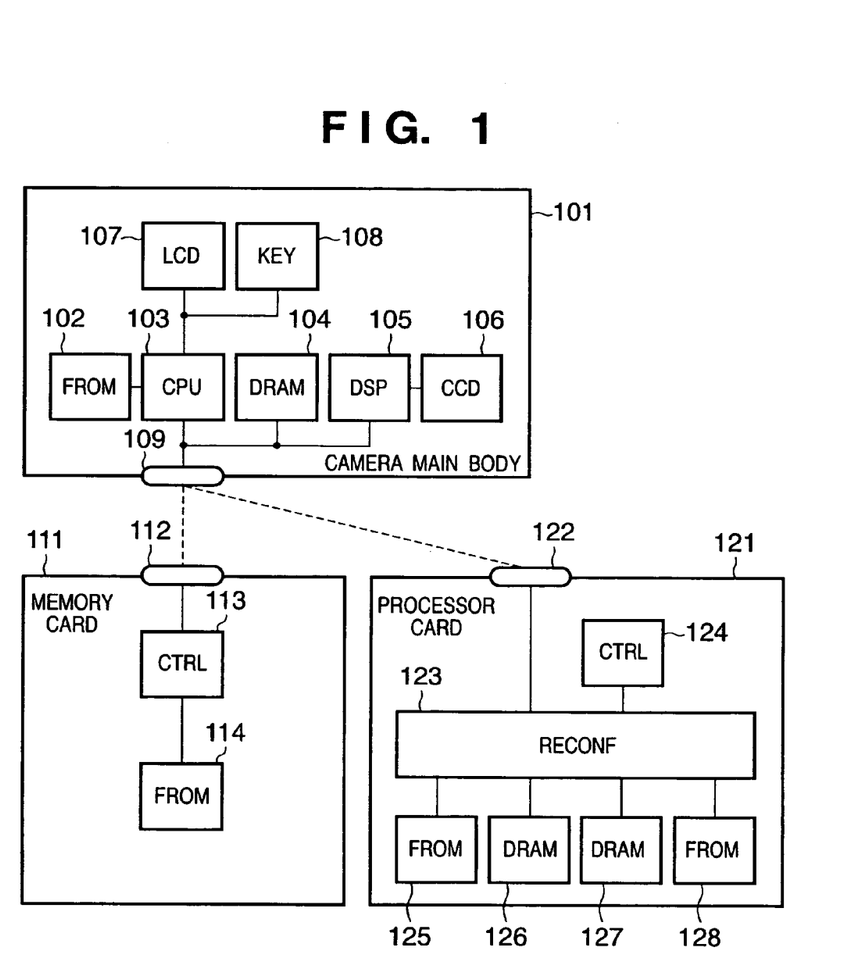
FIG. 1 is a block diagram showing the functional arrangement of a camera according to an embodiment of the present invention.
Figure 2:
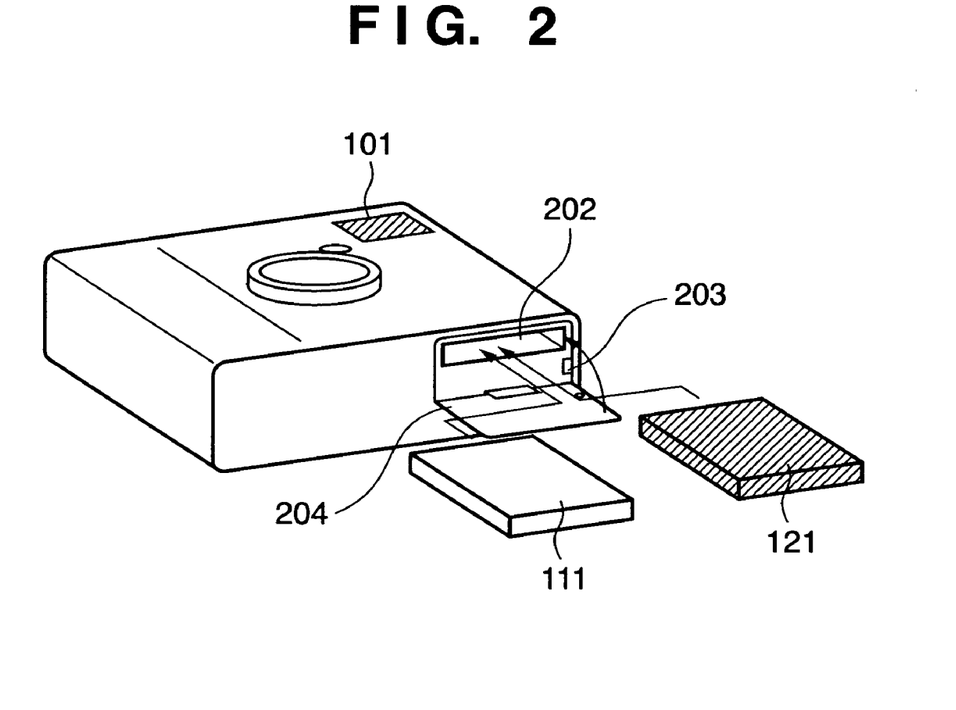
FIG. 2 is a perspective view showing the rear surface of the camera shown in FIG. 1.

FIG. 1 is a block diagram showing the functional arrangement of a camera according to the embodiment of the present invention. FIG. 2 is a perspective view showing the rear surface of the camera shown in FIG. 1. An outline of operation of each part of the camera according to the embodiment will be described.

In using the camera, a memory card 111 or a processor card 121 is inserted into a card slot 202 of a camera main body 101, as shown in FIG. 2. The opening/closing state of a card slot cover 204 is detected by an open/close sensor 203. The memory card 111 and the processor card 121 receive necessary power from the camera main body 101.

An image is not recorded by only the camera main body 101 in the embodiment, but may be recorded by only the main body 101.

<Camera Operation when Memory Card is Mounted>

An operation when the memory card 111 is mounted in the camera main body 101 will be explained.

When the user inserts the memory card 111 into the card slot 202 of the camera main body 101, a connector 109 of the camera main body 101 and a connector 112 of the memory card 111 are connected.

The camera main body 101 is controlled by a CPU 103; the CPU 103 performs control in accordance with an executable code written in advance in a non-volatile memory (FROM)

102. In control, the CPU 103 uses a rewritable memory (DRAM) 104 as a work area. The user executes an image sensing operation with a keyboard (KEY) 108. The open/close sensor 203 in FIG. 2 is part of the circuit of the KEY 108. The signal of the KEY 108 is read by the CPU 103 to perform a predetermined image sensing operation. The camera main body 101 comprises a liquid crystal display device (LCD) 107 as a user interface, and the display is controlled by the CPU 103 in an image sensing operation. The CPU 103 can determine the power supply state of the camera main body 101 as needed.

When the user designates the start of image sensing with the KEY 108, the CPU 103 controls a CCD signal processing unit (DSP) 105 to expose an image sensing element (CCD) 106. Image data obtained by image sensing is temporarily saved in a specific area of the DRAM 104. This image data corresponds to the exposure amount of each pixel of the CCD 106, and will be called RAW data.

The CPU 103 reads out RAW data stored in the DRAM 104, sequentially converts them into a compression recording format, and transmits the compressed data to a controller (CTRL) 113 in the memory card 111 connected via the connector 109. The CTRL 113 stores the compressed data in a non-volatile memory (FROM) 114.

The above-described operation is executed by the camera main body 101 and the memory card 111 in correspondence with one image sensing operation.

When the user designates playback of image data with the KEY 108, the CPU 103 controls the CTRL 113 in the memory card 111, reads out compressed image data obtained by image sensing from the FROM 114, and transfers the image data to the DRAM 104 while performing an expansion process corresponding to the compression. The CPU 103 then displays the expanded data in the DRAM 104 on the LCD 107. The user can see the image data displayed on the LCD 107.

<Camera Operation when Processor Card is Mounted>

An operation when the processor card 121 is inserted into the card slot 202 will be explained.

As shown in FIG. 2, in the embodiment, the processor card 121 is equal in thickness, width, and length to the memory card 111, and can be inserted into the card slot 202 similarly to the memory card 111. The user can discriminate the processor card 121 from the memory card 111 by their appearances because the upper surface of the processor card 121 has a wavy metal radiation plate.

The processor card 121 has a connector 122 which is identical in electrical characteristic and shape to the connector 112. The processor card 121 includes a reconfigurable logic circuit (RECONF) 123, a controller (CTRL) 124 for the RECONF 123, non-volatile memories (FROMs) 125 and 128, and rewritable memories (DRAMs) 126 and 127.

The RECONF 123 can freely change the configuration of its logic circuit by the CTRL 124.

Data necessary for determine the logical configuration of the RECONF 123 is saved in the FROM 128, and if necessary, the CTRL 124 reads out the data from the FROM 128 to determine the logical configuration of the RECONF 123. The data of the FROM 128 can also be externally rewritten via the connector 122.

Figure 3:
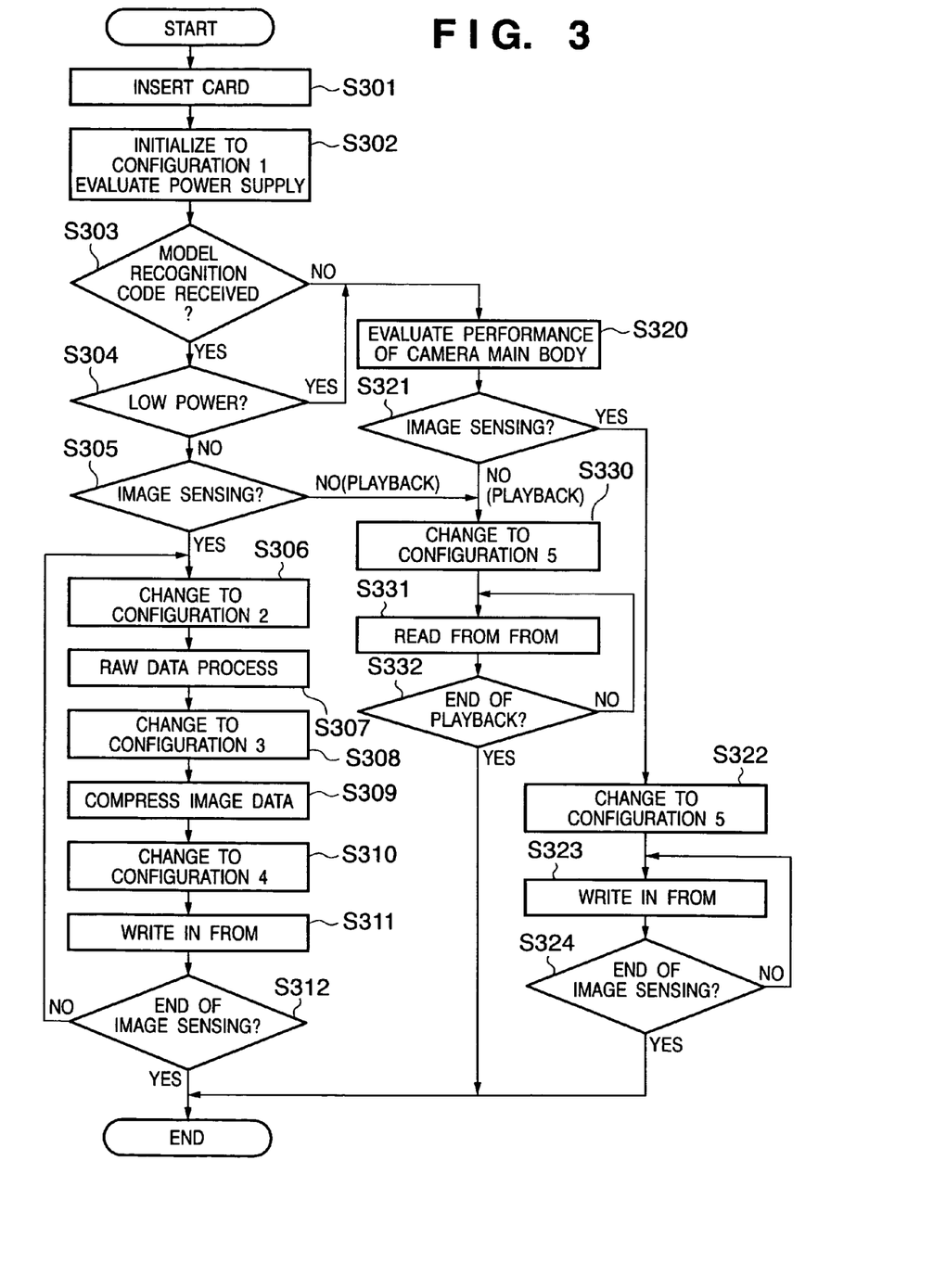
FIG. 3 is a flowchart showing the flow of operation in a processor card according to the embodiment of the present invention.

The operation of the processor card 121 will be described with reference to the flowchart of FIG. 3.

The processor card 121 is inserted into the card slot 202 of the camera main body 101, and the connector 122 is connected to the connector 109 (step S301). Power is supplied from the camera main body 101 and the processor card 121 is initialized.

Figure 4:
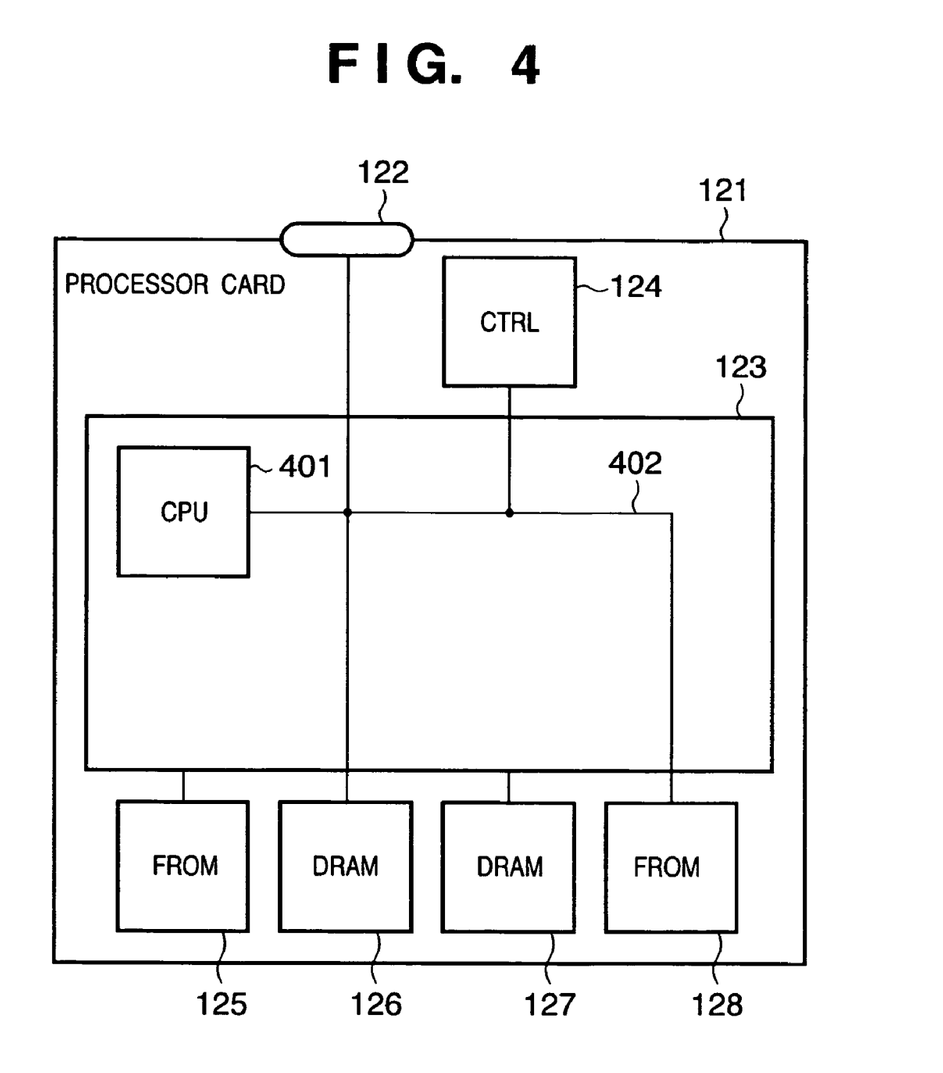
FIG. 4 is a block diagram showing the logical configuration of configuration 1 in initialization according to the embodiment of the present invention.

Immediately after activation, the RECONF 123 in the processor card 121 is initialized into a configuration as shown in FIG. 4 in step S302. In the embodiment, the configuration shown in FIG. 4 will be called configuration 1. A CPU 401 is a processor configured by the RECONF 123, and is connected to the CTRL 124 and FROM 128 via a signal bus 402 which is simultaneously configured.

After the setting of the logical configuration, the CTRL 124 notifies the CPU 401 and CPU 103 of the end of setting of the logical configuration. At this time, the CPU 401 communicates with the CPU 103 to receive power data DPW suppliable from the camera main body 101.

If the control processor CPU 103 of the camera main body 101 detects by the open/close sensor 203 serving as part of the KEY 108 that any device has been connected to the connector 109, the CPU 103 transmits a model recognition code representing a camera model name to the connected device. In step S303, the processor card 121 determines whether the model recognition code has been received. If the processor card 121 corresponds to the model recognition code, the CPU 401 receives it and responds to it. The memory card 111 described above does not correspond to the model recognition code, and does not send back any response. By this response process, the CPU 103 can determine whether the connected device is the memory card 111 or the processor card 121. At the same time, the CPU 401 can detect the model of the connected camera main body 101. Even if no model recognition code can be received after the lapse of a predetermined time since the card is inserted, the CPU 401 determines that the connected camera is an old model which does not correspond to the model recognition code, and the flow advances to step S320.

In step S304, it is determined whether the power data DPW received in step S302 is smaller than a predetermined value. If YES in step S304, the CPU 401 determines that the processes in steps S305 to S311 to be described later cannot be performed, and the flow advances to step S320 for low-power operation.

If NO in step S304, the flow advances to step S305, and the CPU 401 communicates with the CPU 103. If the user designates image sensing with the KEY 108, the flow advances to step S306; if the user does not designate image sensing (in this case, playback is assumed to be designated), to step S330.

In step S306, the CPU 401 compares the model recognition code received in step S303 and information written in advance in the FROM 128 to recognize an image sensing operation of the camera main body 101. In the embodiment, the camera main body 101 performs exposure, the RAW data process, conversion into a recording format, and writing in the FROM, as described above. In correspondence with this flow, the CPU 401 reads out configuration data from the FROM 128 and sends it to the CTRL 124. Then, the CTRL 124 changes the logical configuration of the RECONF 123. The changed logical configuration is shown in FIG. 5 (configuration 2).

Figure 5:
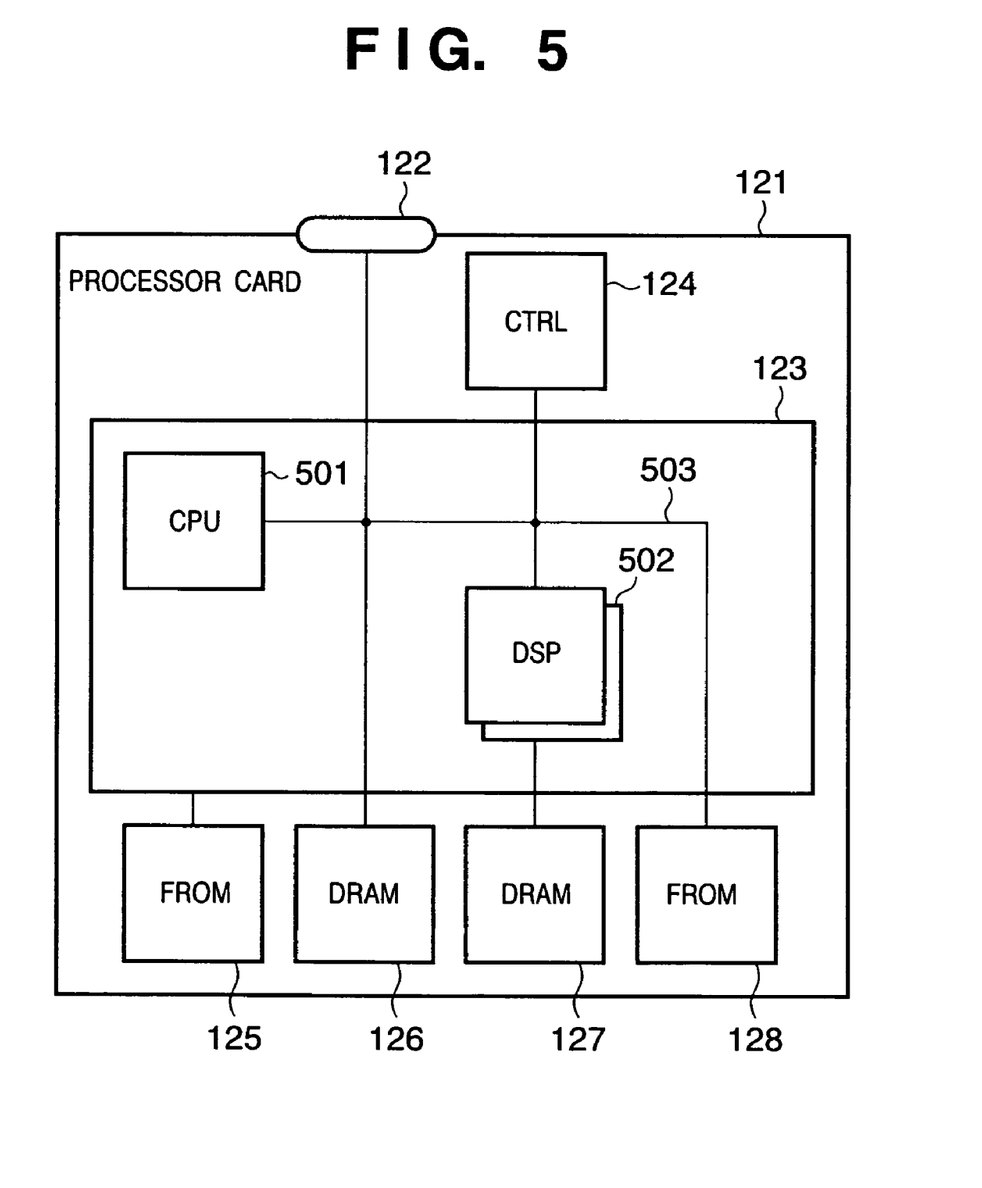
FIG. 5 is a block diagram showing the logical configuration of configuration 2 for a RAW data process according to the embodiment of the present invention.

The configuration in FIG. 5 is a logical configuration specialized in the RAW data process. This configuration can perform a process at a higher speed than the above-mentioned RAW data process which is executed within the camera main body 101 of FIG. 1. In order to realize a high-speed process, the configuration corresponding to the DSP 105 in FIG. 1 is multiplexed by changing the logical configuration of a signal processing unit DSP 502 having double the performance. A CPU 501 and a signal bus 503, which correspond to communication with the DSP 502, are logically configured. Similar to the CPU 401, the CPU 501 performs control in accordance with an executable code written in advance in the FROM 128.

The CPU 501 performs necessary control for the DSP 502. The DSP 502 can directly read out an executable code and data from the FROM 128, as needed. Most part of the band of the signal bus 503 is used for a signal process by the DSP 502.

After the setting of the logical configuration, the CTRL 124 notifies the CPU 501 and CPU 103 of the end of setting of the logical configuration.

The CPU 103 displays on the LCD 107 a message that the processor card 121 performs a RAW data process in step S307 to be described later. From this display, the user can recognize that a higher-speed signal process of a higher speed than a process performed by only the camera main body 101 is performed by the processor card 121. The user can also grasp the camera state and reflect it in an image sensing operation.

If the user designates the start of image sensing by operating the KEY 108, the CPU 103 starts exposing the CCD 106, similar to the operation when the memory card 111 is mounted. When the memory card 111 is mounted, the DSP 105 executes the RAW data signal process. In this case, however, the DSP 105 does not perform any process, and RAW data is sent to the processor card 121 via the signal connectors and then to the DSP 502 via the signal bus 503. The DSP 502 executes the RAW data process (step S307), and saves RAW data in the DRAM 127. The DRAM 127 has a higher speed and larger capacity than those of the DRAM 104. At this time, part of the image process may be properly assisted by the CPU 103 and the DSP 105 in accordance with the performance.

After the end of the RAW data process, the DSP 502 notifies the CPU 501, the CTRL 124, and the CPU 103 of the end of the process.

In response to the end of the RAW data process, the CPU 501 reads out configuration data from the FROM 128 and sends it to the CTRL 124. Then, the CTRL 124 changes the logical configuration of the RECONF 123 (step S308). The changed logical configuration is shown in FIG. 6 (configuration 3).

Figure 6:
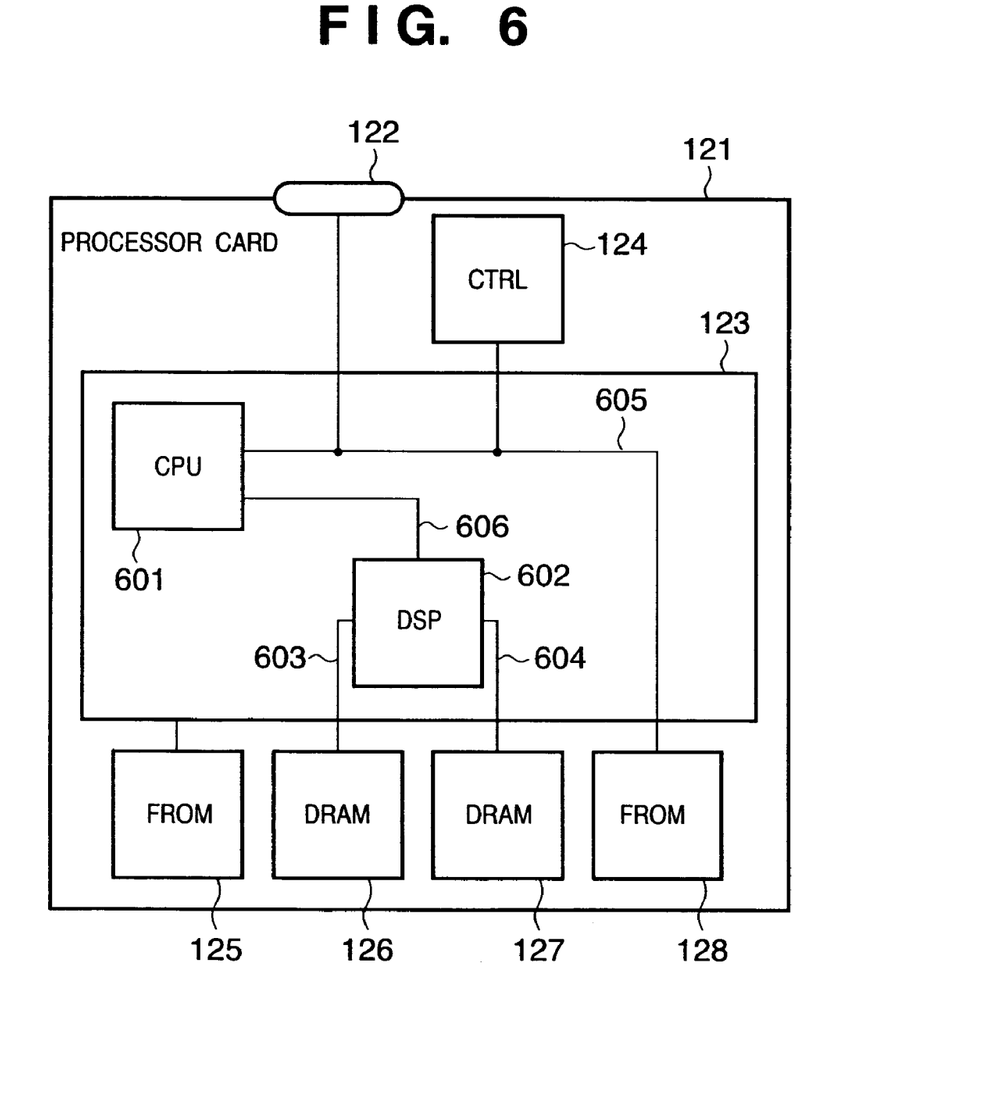
FIG. 6 is a block diagram showing the logical configuration of configuration 3 for a data compression process according to the embodiment of the present invention.

The configuration in FIG. 6 is a logic circuit configuration specializing in the conversion of RAW data into a recording data format. In this configuration, a DSP 602 is an image processing circuit dedicated to conversion into the recording data format. The DSP 602 is connected to the DRAM 126 via a signal bus 603 and to the DRAM 127 via a signal bus 604. A CPU 601 is a processor specializing in control of the DSP 602, and is connected to the FROM 128, the CTRL 124, and the CPU 103 via a signal bus 605. The CPU 601 performs control in accordance with an operation code written in advance in the FROM 128. The CPU 601 and the DSP 602 are connected by a control bus 606, and the CPU 601 controls the DSP 602.

After the setting of the logical configuration, the CTRL 124 notifies the CPU 601 and the CPU 103 of the end of setting of the logical configuration.

The CPU 103 displays on the LCD 107 a message that the processor card 121 performs an image compression process in step S309 to be described later. From this display, the user can recognize that a higher-speed signal process of a higher speed than a process performed by only the camera main body 101 is performed by the processor card 121. The user can also grasp the camera state and reflect it in image sensing operation.

The DSP 602 reads out RAW data generated by the RAW data process in step S307 from the DRAM 127, sequentially performs a data compression process, and saves the compressed data in the DRAM 126 (step S309). The compression method is not particularly limited, and may be lossless compression or lossy compression. Part of the image process may be properly assisted by the CPU 103 in accordance with the performance.

After the end of the image compression process, the DSP 602 notifies the CPU 601, the CTRL 124, and the CPU 103 of the end of the process.

In response to the end of the image compression process, the CPU 601 reads out configuration data from the FROM 128 and sends it to the CTRL 124. Then, the CTRL 124 changes the logical configuration of the RECONF 123 (step S310). The changed logical configuration is shown in FIG. 7 (configuration 4).

Figure 7:
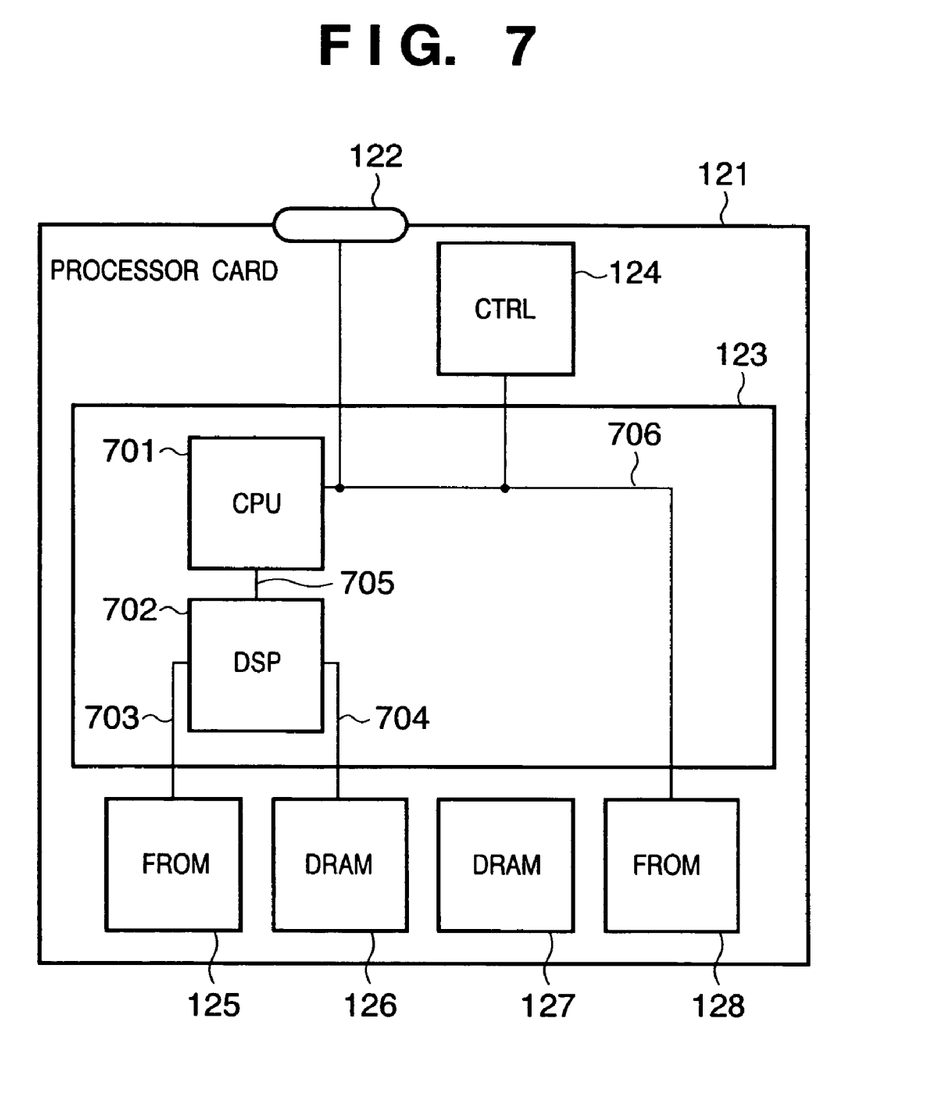
FIG. 7 is a block diagram showing the logical configuration of configuration 4 for writing data according to the embodiment of the present invention.

The configuration in FIG. 7 is a logic circuit configuration specializing in writing of compressed image data in the FROM 125. In this configuration, a DSP 702 is a processing circuit dedicated to writing compressed image data in the FROM 125 at a high speed. The DSP 702 is connected to the DRAM 126 via a signal bus 704 and to the FROM 125 via a signal bus 703. A CPU 701 is a processor specializing in control of the DSP 702, and is connected to the FROM 128, the CTRL 124, and the CPU 103 via a signal bus 706. The CPU 701 performs control in accordance with an operation code written in advance in the FROM 128. The CPU 701 and the DSP 702 are connected by a control bus 705, and the CPU 701 controls the DSP 702.

After the setting of the logical configuration, the CTRL 124 notifies the CPU 701 and the CPU 103 of the end of setting of the logical configuration.

The CPU 103 displays on the LCD 107 a message that the processor card 121 performs writing in the FROM in step S311 to be described later. From this display, the user can recognize that a higher-speed signal process of a higher speed than a process performed by only the camera main body 101 is performed by the processor card 121. The user can also grasp the camera state and reflect it in image sensing operation.

The DSP 702 reads out image data compressed in step S309, sequentially performs a write data process, and saves the compressed data in the FROM 125 (step S311). Part of the data process may be properly assisted by the CPU 103 in accordance with the performance.

After the end of the data write process, the DSP 702 notifies the CPU 701, the CTRL 124, and the CPU 103 of the end of the process.

The CPU 103 determines whether the user tries to continue the image sensing operation by using the KEY 108. In step S312, the CPU 701 communicates with the CPU 103. If image sensing is determined to end, the process ends; if image sensing is determined to continue, the process returns to step S306 to repeat the above process.

If it is determined in step S303 that no model recognition code can be received even upon the lapse of a predetermined time after the processor card 121 is inserted, or if it is determined in step S304 that the received power data DPW is smaller than a predetermined value, the CPU 401 of configuration 1 shown in FIG. 4 communicates with the CPU 103 of the camera main body 101, and the camera main body 101 measures the read/write rate via the connector 109 in step S320. The measurement result is used in steps S322 and S330 to be described later.

In step S321, similar to step S305, the CPU 401 communicates with the CPU 103 and determines whether the user designates image sensing with the KEY 108. If the user designates image sensing, the flow advances to step S322; if the user does not designate image sensing (in this case, playback is assumed to be designated), to step S330.

Figure 8:
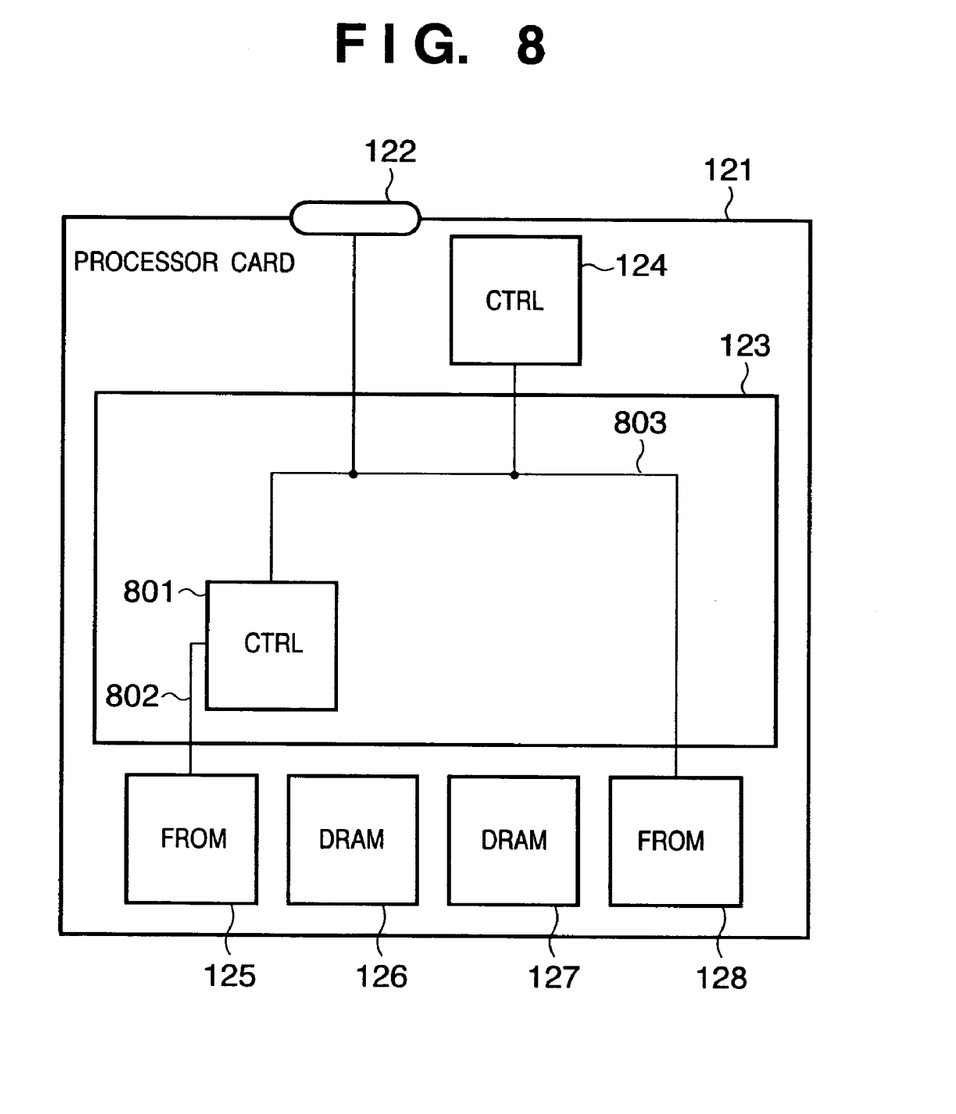
FIG. 8 is a block diagram showing the logical configuration of configuration 5 for writing/reading data according to the embodiment of the present invention.

In step S322, the CPU 401 reads out configuration data from the FROM 128 and sends it to the CTRL 124. Then, the CTRL 124 changes the logical configuration of the RECONF 123. The changed logical configuration is shown in FIG. 8 (configuration 5). The logic circuit in FIG. 8 is the same as the above-described logic circuit in the memory card 111, and a CTRL 801 is an equivalent circuit to the CTRL 113. The CTRL 801 is connected to the FROM 125 and saves image data in the FROM 125 (step S323).

The CTRL 801 is optimized for the read/write rate measured in step S320, and can write data at the maximum write rate of the FROM 125. Operation by the logic circuit changed in step S322 is the same as operation by the memory card 111 when viewed from the camera main body 101.

In step S324, similar to step S312, the CPU 801 communicates with the CPU 103, and determines whether to end image sensing. If image sensing is determined to end, the process ends; if image sensing is determined to continue, the process returns to step S323 to repeat the above process.

If it is determined in step S305 or S321 that no image sensing is designated (in this case, playback is designated), the process advances to step S330 to change the logical configuration into that of configuration 5 shown in FIG. 8, similar to step S321. Also at this time, the CTRL 801 is optimized for the read rate measured in step S320, and can read out data at the maximum read rate of the FROM 125. Operation by the logic circuit changed in step S330 is the same as operation by the memory card 111 when viewed from the camera main body 101.

In step S331, the same operation as playback operation upon mounting the memory card 111 is performed.

The CPU 103 determines whether the user tries to continue playback operation by using the KEY 108. In step S332, the CPU 801 communicates with the CPU 103. If playback is determined to end, the process ends; if playback is determined to continue, the process returns to step S331 to repeat the above process.

As has been described above, according to the embodiment, a general-purpose digital camera which is widely used at present can be easily used as a high-grade convertible model by only inserting into the digital camera a processor card which can execute a process of the digital camera at a higher speed.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-194297 filed on Jun. 30, 2004, which is hereby incorporated by reference herein.

What is claimed is:

1. A processing device mountable and integratable in an image sensing apparatus comprising:
   a logic circuit changeable to a plurality of configurations which implement functions corresponding to a plurality of processes performed by the image sensing apparatus;
   a memory that stores configuration information indicative of possible configurations of said logic circuit;
   a storage device that stores image data acquired by the image sensing apparatus; and
   a controller that changes a configuration of said logic circuit on the basis of the configuration information stored in said memory so that said logic circuit performs the plurality of processes in place of the image sensing apparatus,
   wherein said controller changes the configuration of said logic circuit to a first configuration suitable for a first process so that said logic circuit performs the first process on the image data in place of the image sensing apparatus, and, after an end of the first process by said logic circuit of the first configuration, automatically changes the configuration of said logic circuit to a second configuration suitable for a second process so that said logic circuit performs the second process on the image data on which the first process is performed in place of the image sensing apparatus.

2. The device according to claim 1, wherein the plurality of processes include at least a compression process for compressing the image data and a process of storing the compressed image data in said storage device.

3. The device according to claim 1, wherein the functions of said logic circuit increase the speed at which the plurality of processes performed by the image sensing apparatus are performed.

4. The device according to claim 1,
   further comprising a determination unit that determines whether the image sensing apparatus corresponds to said processing device,
   wherein if the image sensing apparatus corresponds to said processing device, said controller changes the configuration of said logic circuit to one of the first and second configurations, and if the image sensing apparatus does not correspond to said processing device, said controller changes the configuration of said logic circuit to a configuration having a function serving as a storage medium.

5. The device according to claim 1,
   further comprising a determination unit that determines the performance of the image sensing apparatus,
   wherein said controller controls the configuration of said logic circuit on the basis of the performance of the image sensing apparatus that is determined by said determination unit.

6. The device according to claim 1,
   further comprising a detection unit that detects a remaining amount of power available to the image sensing apparatus,
   wherein said controller changes said logic circuit to a configuration corresponding to the remaining amount of power.

7. The device according to claim 1, wherein the image sensing apparatus comprises a unit that connects a general purpose memory card, and said processing device has a connection terminal corresponding in physical shape to the general purpose memory card.

8. The device according to claim 1, wherein at least part of a sheath of said processing device is formed from a radiation plate.

9. An image sensing apparatus comprising:
   a connection unit that can integrally mount said processing device defined in claim 1; and
   a display unit that displays that information indicating that some of processes of the image sensing apparatus are executed by said processing device when said processing device is mounted.

10. A processing device mountable and integratable in an image sensing apparatus, comprising:

a logic circuit changeable to a plurality of configurations which implement functions corresponding to a plurality of processes;

a memory that stores configuration information indicative of possible configurations of said logic circuit;

a storage unit that stores image data acquired by the image sensing apparatus; and a controller that changes a configuration of said logic circuit on the basis of the configuration information stored in said memory so that said logic circuit performs the plurality of processes in place of the image sensing apparatus, wherein said controller automatically changes the configuration of said logic circuit to a first configuration suitable for a RAW image process so that said logic circuit performs the RAW image process on image data acquired by the image sensing apparatus in place of the image sensing apparatus in accordance with an image sensing instruction provided by the image sensing apparatus, and, after an end of the RAW image process by said logic circuit of the first configuration, automatically changes the configuration of said logic circuit from the first configuration to a second configuration suitable for a compression process so that said logic circuit compresses the image data which has undergone the RAW image process in place of the image sensing apparatus.

11. The device according to claim 10, wherein said controller, after an end of the compression process by said logic circuit of the second configuration, automatically changes the configuration of said logic circuit from the second configuration to a third configuration suitable for a storing process so that said logic circuit stores the compressed image data in place of the image sensing apparatus storing the compressed image data in the storage unit.

12. The device according to claim 11, wherein said controller automatically changes the configuration of said logic circuit to a predetermined configuration suitable for recognizing the image sensing apparatus if the processing device is mounted in the image sensing apparatus, and changes the configuration of said logic circuit from the predetermined configuration to the first configuration in accordance with the image sensing instruction.

13. The device according to claim 12, wherein if the logic circuit detects that power supplied from the image sensing apparatus is low, the controller changes the configuration of the logic circuit from the predetermined configuration to a fourth configuration suitable for storing the image data in the storage unit by the image sensing apparatus so that the image sensing apparatus stores the image data in the storage unit.

14. The device according to claim 10, wherein the controller notifies the image sensing apparatus of the end of the RAW image process after the end of the RAW image process, and notifies the image sensing apparatus of an end of the compression process after the end of the compression process.

* * * * *